United States Patent [19]

Nishizaki et al.

[11] Patent Number: 4,457,136
[45] Date of Patent: Jul. 3, 1984

[54] METAL HYDRIDE REACTOR

[75] Inventors: Tomoyoshi Nishizaki, Suita; Miyamoto Minoru, Kusatsu; Kazuaki Miyamoto, Amagasaki; Ken Yoshida, Ibaraki; Kathuhiko Yamaji; Yasushi Nakata, both of Osaka, all of Japan

[73] Assignee: Sekisui Kagaku Kogyo Kabushiki Kaisha, Osaka, Japan

[21] Appl. No.: 358,797

[22] Filed: Mar. 16, 1982

[30] Foreign Application Priority Data

| Mar. 23, 1981 | [JP] | Japan | 56-40879[U] |
| Mar. 23, 1981 | [JP] | Japan | 56-42667 |
| Jun. 22, 1981 | [JP] | Japan | 56-91928[U] |
| Jun. 22, 1981 | [JP] | Japan | 56-91929[U] |
| Jul. 7, 1981 | [JP] | Japan | 56-101611[U] |
| Jul. 7, 1981 | [JP] | Japan | 56-101612[U] |
| Jul. 7, 1981 | [JP] | Japan | 56-101613[U] |
| Dec. 8, 1981 | [JP] | Japan | 56-197937 |
| Dec. 8, 1981 | [JP] | Japan | 56-197938 |

[51] Int. Cl.$^3$ .............................................. F17C 11/00
[52] U.S. Cl. .................................... 62/48; 165/104.12
[58] Field of Search ........................ 62/48; 165/104.12

[56] References Cited

U.S. PATENT DOCUMENTS

| 4,161,211 | 7/1979 | Duffy | 62/48 X |
| 4,165,569 | 8/1979 | Mackay | 62/48 X |
| 4,187,092 | 2/1980 | Woolley | 62/48 |
| 4,196,525 | 4/1980 | Ebdon et al. | 62/48 X |
| 4,270,360 | 6/1981 | Nakane et al. | 62/48 |

Primary Examiner—Albert W. Davie, Jr.
Attorney, Agent, or Firm—Wenderoth, Lind & Ponack

[57] ABSTRACT

A metal hydride reactor comprising a tubular pressure receptacle having an opening at its one end and a metal hydride filling the receptacle therein, at least a part of the outer wall surface of the tubular pressure receptacle forming a heat-exchanging surface; a heat-conducting fin of a heat-conducting material provided to transmit heat from the metal hydride in the pressure receptacle to the heat-exchanging surface and limit the location of the metal hydride in the pressure receptacle; and at least one porous member extending axially of the receptacle for forming within the receptacle a hydrogen gas flow passage leading to the opening of the receptacle, the porous member being permeable to hydrogen gas but impermeable to the metal hydride.

22 Claims, 37 Drawing Figures

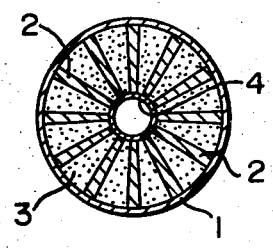
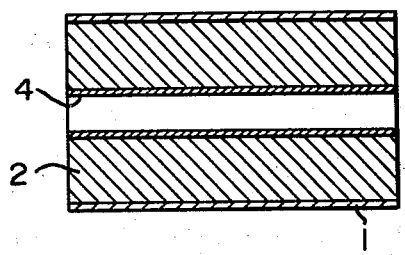
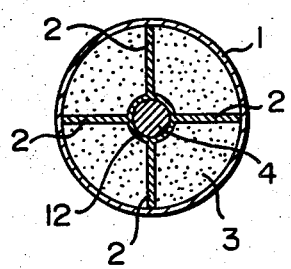
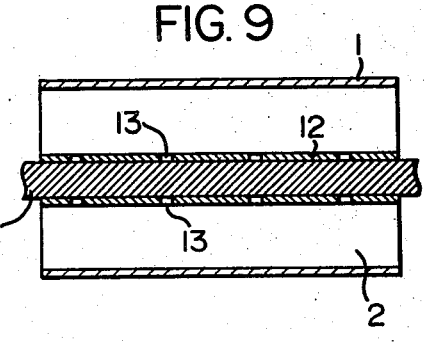
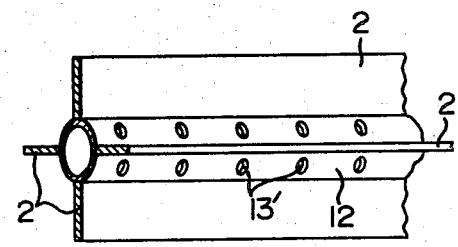
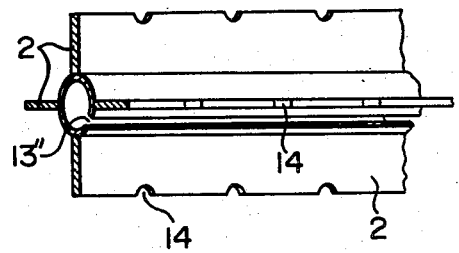

FIG. 32(a)    FIG. 32(b)    FIG. 32(c)
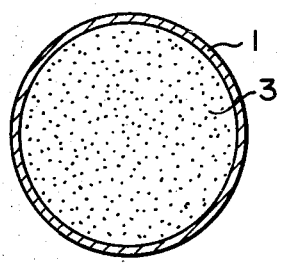
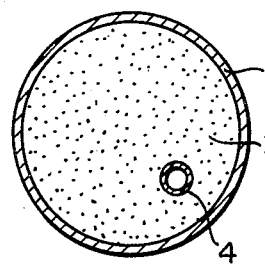
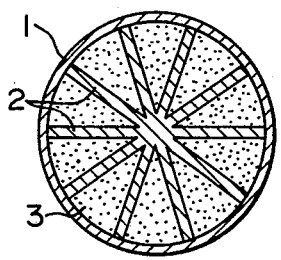
FIG. 33
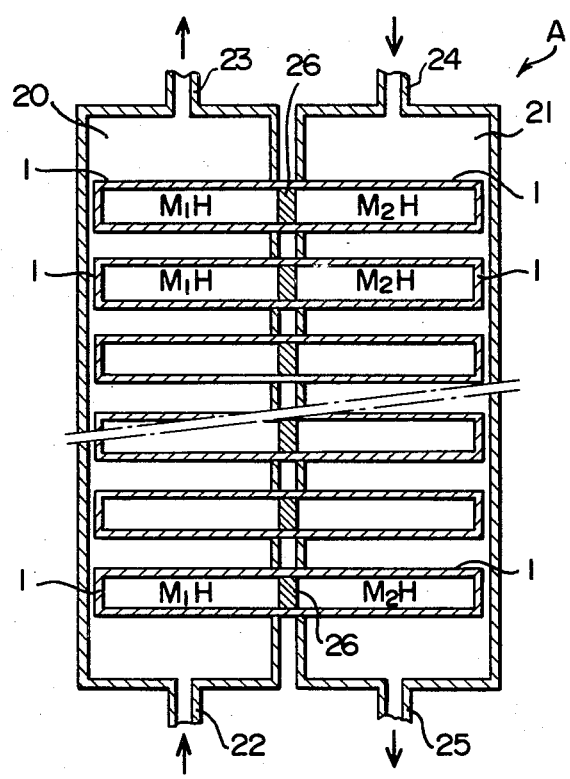

METAL HYDRIDE REACTOR

BACKGROUND OF THE INVENTION

This invention relates to a metal hydride reactor.

It is known that many metals or alloys occlude hydrogen exothermically to form metal hydrides, and the metal hydrides reversibly release hydrogen gas endothermically.

$LaNi_5H_x$, $MmNi_5H_x$, $MmCo_5H_x$, $FeTiH_x$, $VNbH_x$ and $Mg_2CuH$ are among examples of metal hydrides which are suitably used because of their ability to occlude a large amount of hydrogen and to release a large amount of the heat of reaction. In recent years, there have been proposed various metal hydrides devices such as heat pumps or hydrogen storage devices which utilize these properties of the metal hydrides.

A metal hydride reactor is known which comprises a large pressure vessel and a heat medium flowing pipe extending therethrough so as to perform heat exchange between a metal hydride in the vessel and the heat medium (Japanese Laid-Open Patent Publication Nos. 7057/1977 and 92144/1977). This type of reactor, however, must be large-sized because of the presence of the heat medium flowing pipe and its heat capacity is so high as to cause a decrease in heat efficiency. Furthermore, the apparatus is complex and large-scaled in order to withstand the volumetric expansion of the metal hydride incident to the occlusion of hydrogen. Moreover, since the area of is heat-conducting surface is small and the heat conduction and diffusion of hydrogen in the reactor are insufficient, the rate of the reaction is slow, and its output as a heat pump is low.

There is also known a reactor which is adapted to exchange heat through its outer wall instead of the heat medium flow pipe within the pressure reactor vessel (Japanese Laid-Open Patent No. 94192/1981). This type of reactor has the advantage that its heat capacity is smaller than that of the internal heat-exchanging type reactor. However, the diffusion of hydrogen is insufficient, and its resistance to the volumetric expansion of the metal hydride is low.

A reactor has also been suggested which comprises a pressure vessel and a hydrogen gas flow passage formed therein (Japanese Laid-Open Patent Publication No. 14210/1977). This reactor is improved in regard to the diffusion of hydrogen. But its resistance to the volumetric expansion of the metal hydride is still insufficient, and the conduction of heat from the metal hydride to a heat medium is low.

In a metal hydride device utilizing metal hydrides, the metal hydrides fill pressure vessels, and the hydrogen occluding and releasing reactions are carried out in the pressure vessels. During the repetition of hydrogen occlusion and releasing, the metal hydrides disintegrate into fine powders having a size of several microns. This reduces the conduction of heat between the metal hydrides, and the reaction does not proceed rapidly. Another problem is that when the finely divided metal hydrides densely gather at the bottoms of the pressure vessels, there is a risk that the pressure vessels will break when the volume of the metal hydrides expands incident to hydrogen occlusion, and hydrogen gas is not fully diffused to that part of the vessel in which the metal hydrides are densely packed.

OBJECT AND SUMMARY OF THE INVENTION

It is an object of this invention to provide a metal hydride reactor which is free from the aforesaid defects of the prior art.

According to this invention, there is provided a metal hydride reactor comprising a tubular pressure receptacle having an opening at its one end and a metal hydride filling the receptacle, at least a part of the outer wall surface of the tubular pressure receptacle forming a heat-exchanging surface; a heat-conducting fin of a heat-conducting material provided to transmit heat from the metal hydride in the pressure receptacle to the heat-exchanging surface and limit the location of the metal hydride in the pressure receptacle; and at least one porous member extending axially of the receptacle for forming within the receptacle a hydrogen gas flow passage leading to the opening of the receptacle, the porous member being permeable to hydrogen gas but impermeable to the metal hydride.

The metal hydride reactor of this invention has a pressure-resistant receptacle in the form of a tube, preferably a cylinder. The receptacle has at its one end an opening for passing hydrogen therethrough. At least a part of the outer wall of the tubular receptacle forms a heat-exchanging surface for supplying heat into the receptacle and removing heat from the receptacle. Hence, the pressure receptacle in accordance with this invention has no heat-exchanging means such as a heat medium flow pipe therein. The pressure receptacle is made of a material which is impermeable to hydrogen, is a good heat-conductor and does not become brittle under the effect of hydrogen, such as aluminum, stainless steel, copper, brass, etc. The pressure receptacle is designed so as to withstand hydrogen pressures of 10 to 30 atmospheres.

In the metal hydride reactor of this invention, a heat-conducting fin made of a material having good heat conductivity is provided within the pressure receptacle. The heat-conducting fin serves to transmit heat to the heat-conducting surface of the pressure receptacle from the metal hydride and to limit the movement of the metal hydride within the pressure receptacle, thereby preventing the metal hydride from gathering at a specified site. The heat-conducting fin, like the pressure receptacle, is made of aluminum, stainless steel, copper, brass, etc. If desired, the heat-conducting fin and the pressure receptacle may be built as a one-piece structure by extrusion molding.

Furthermore, the metal hydride reactor of this invention is equipped with a porous member permeable to hydrogen gas but impermeable to metal hydride which extends axially of the receptacle for forming within the pressure receptacle a hydrogen gas flow passage leading to the opening of the receptacle at its one end. The porous member is composed of a metal or a plastic. Preferably, the porous member is composed of an elastically deformable material, for example a sintered or stretched porous article of a plastic material such as a fluorocarbon resin (e.g., polytetrafluoroethylene) or a polyolefin resin such as polyethylene or polypropylene. In order for the porous member to be impermeable to the fine powder of the metal hydride but permeable to hydrogen gas, the pore diameter of the porous member should generally be in the range of 1 to 5 microns. Preferably, the porous member is formed in a hollow tubular shape.

In one embodiment of the present invention, the heat-conducting fin is comprised of a plurality of flat plate-like members which extend from the tubular wall of the pressure receptacle toward the center of the axis of the tube and are elongated in the axial direction of the tube. The porous member is provided so as to extend nearly along the center axis of the pressure receptacle, and at least one of the flat plate-like members extends to a point at which its inside end abuts against the porous member located along the center axis. Thus, the pressure receptacle is divided into a plurality of chambers elongated in the axial direction. A predetermined amount of a metal hydride is provided in each of these divided chambers. As an alternative construction, it is possible to connect the inside ends of the heat-conducting fins to one inner cylinder extending along the center axis of the pressure receptacle and insert the porous member in the inner cylinder. A hydrogen gas flow means is provided on the wall of the inner cylinder. The inner cylinder and the heat-conducting fins may be produced as a one-piece structure by extrusion molding.

The plate-like heat-conducting fins may also be provided such that they project toward the center axis of the pressure receptacle from one tubular member located in contact with the inner tubular wall of the receptacle. In this case, the heat-conducting fins and the tubular member may be produced as a one-piece structure by extrusion molding.

According to another embodiment, the heat-conducting fins are connected to each other approximately at the center axis of the pressure receptacle to divide the pressure receptacle into a plurality of axially elongated chambers, and the porous member is provided in at least one of these divided chambers. A predetermined amount of a metal hydride dividedly fills the chambers. When one or more of these chambers do not have the porous member extending therethrough, it is necessary to provide many small openings in the heat-conducting fins in order to pass hydrogen between such chambers and the porous member. The heat-conducting fins connected to each other approximately at the center axis of the pressure receptacle can be built as a one-piece structure by extrusion molding.

In the present invention, the heat-conducting fin can be made of a thin sheet having many apertures, for example a metallic sheet folded in a corrugated form.

Furthermore, the heat-conducting fin can be made of a hydrogen-permeable fibrous sheet, for example a carbon fiber sheet folded in a corrugated form.

According to still another embodiment, one porous member extends approximately along the axis of the pressure receptacle, and the heat-conducting fin may be made of a helical plate-like member surrounding the porous member.

According to yet another embodiment, the heat-conducting fin may be of a honeycomb shape provided so that its openings extend axially of the receptacle. The porous member is received in at least one of the openings of the honeycomb, and many apertures or cuts for passing hydrogen gas are provided on the wall of the honeycomb-shaped heat-conducting fin.

According to a further embodiment of this invention, the heat-conducting fin is made of a porous member which is permeable to hydrogen gas but impermeable to a metal hydride so that the heat-conducting fin itself forms a hydrogen passage.

The metal hydride reactor of this invention is used suitably as a heat pump. Such a heat pump is built by filling metal hydrides having different equilibrium dissociation pressure characteristics respectively into two reactors of the types described hereinabove, and connecting these reactors so that hydrogen gas can be exchanged between the two reactors through openings provided in the pressure receptacles. Each of these reactors may comprise a plurality of unit reactors.

In the metal hydride reactor of this invention, hydrogen can move freely from the opening of the receptacle at its one end to the other end of the receptacle through the porous member extending axially of the pressure receptacle, and the hydrogen occlusion and releasing reactions of the metal hydride are carried out nearly uniformly throughout the pressure receptacle. Even when the metal hydride is finely divided as a result of the reaction, the hampering of the hydrogen flow owing to the deposition of the metal hydride powder is very much reduced.

The heat-conducting fin within the pressure receptacle improves heat conduction between the metal hydride and the heat-conducting surface of the pressure receptacle. Furthermore, since the heat-conducting fin substantially divides the pressure receptacle into a plurality of chambers and the metal hydride is fills these chambers, the metal hydride is prevented from being localized at a specified site, for example the bottom, of the receptacle.

In the metal hydride reactor of this invention described hereinabove, a hydrogen passage can be secured over the entire metal hydride distributed nearly uniformly in the pressure receptacle and the heat conduction is improved. Hence, the rates of hydrogen occlusion and releasing of the metal hydride are increased. Furthermore, since the heat capacity of the reactor is relatively low, the heat efficiency of the apparatus as a whole is greatly improved. Moreover, since the metal hydride is not localized in the pressure vessel, the risk of breakage of the receptacle by the volumetric expansion of the metal hydride is markedly reduced. In addition, because substantially axially elongated chambers are formed within the pressure receptacle, a metal hydride can be easily directed into the pressure receptacle from its one end.

BRIEF DESCRIPTION OF THE DRAWINGS

The preferred embodiments of the invention are described below in detail with reference to the accompanying drawings in which:

FIG. 3-(b) is a sectional view taken across the axis of a receptacle, showing another embodiment of the invention;

FIG. 6 is a sectional view, taken across the axis of a receptacle, showing another embodiment of this invention;

FIG. 7 is a sectional view taken axially of the embodiment shown in FIG. 6;

FIG. 8 is a sectional view, taken across the axis of a receptacle, of another embodiment of this invention;

FIG. 9 is a sectional view taken axially of the embodiment shown in FIG. 8;

FIGS. 10 and 11 are perspective views showing other examples of the heat-conducting fin shown in FIG. 8;

FIG. 18-(b) is another sectional view taken axially of the embodiment shown in FIG. 17 showing a modification of one end thereof;

FIGS. 32-(a), (b) and (c) are sectional views, taken across the axis of a receptacle, of comparative examples; and FIG. 33 is a sectional view showing a heat pump device composed of the reactors of this invention used in Example 1.

DETAILED DESCRIPTION OF THE PREFERRED EMBODIMENTS

Figure 1:
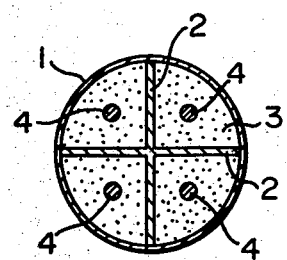
FIG. 1 is a sectional view, taken across the axis of a receptacle, showing one embodiment of the invention.
Figure 2:
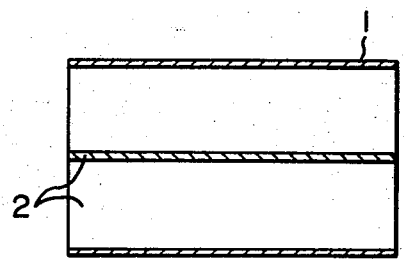
FIG. 2 is a sectional view, taken axially, of the embodiment shown in FIG. 1.

In one embodiment of the metal hydride reactor of this invention shown in FIGS. 1 and 2, a cylindrical pressure receptacle 1 is divided into four axially elongated chambers by two plate-like heat-conducting fins 2 crossing each other at right angles at the center axis of the cylinder and extending diametrically and axially of the cylinder. The pressure receptacle 1 and the heat-conducting fins can be made of aluminum, stainless steel, copper or brass. The pressure receptacle 1 and the heat-conducting fins 2 may be made as a one-piece unit by extrusion molding. Alternatively, the heat-conducting fins may be molded as a one-piece unit and inserted in the pressure receptacle by the shrinking method. To secure good heat conduction between the pressure receptacle and the heat-conducting fins, it is important that the outside ends of the heat-conducting fins be in intimate contact with the inside wall of the tubular receptacle. If desired, the two may be welded together.

Porous members 4 are respectively inserted into the four divided chambers. The porous members 4 are made of a sintered body of a metal such as aluminum, stainless steel, copper or brass or a plastic such as a fluorocarbon resin or a polyolefin resin. The porous members are tubular or pillar-like, and preferably made of a tubular body having a diameter of 0.1 to 3 mm. The pore diameter of the porous members 4 is preferably 1 to 5 microns.

Figure 3A:
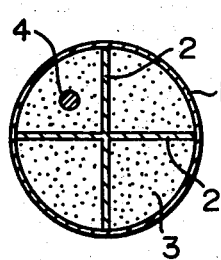
FIG. 3-(a) is a sectional view taken across the axis of a receptacle, showing another embodiment of this invention.
Figure 3B:
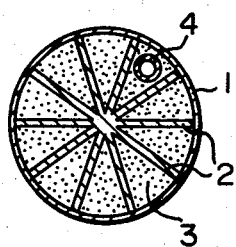
Figure 4:
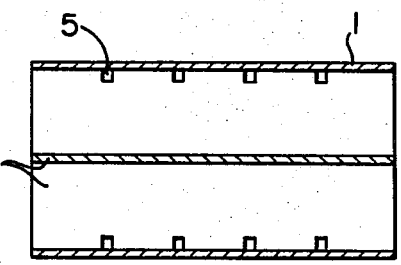
FIG. 4 is a sectional view taken axially of the embodiment shown in FIG. 3-(a)

In the embodiment shown in FIGS. 3-(a) and (4), only one of four chambers divided by heat-conducting fins has a porous member. To permit hydrogen to flow through the four chambers, a plurality of cuts 5 are provided on the outside ends of the heat-conducting fins 2.

The embodiment shown in FIG. 3-(b) is the same as that shown in FIGS. 3-(a) and 4 except that the cylindrical receptacle is divided into ten chambers by means of heat-conducting fins, and tubular porous member 4 is received in one of them.

Figure 5:
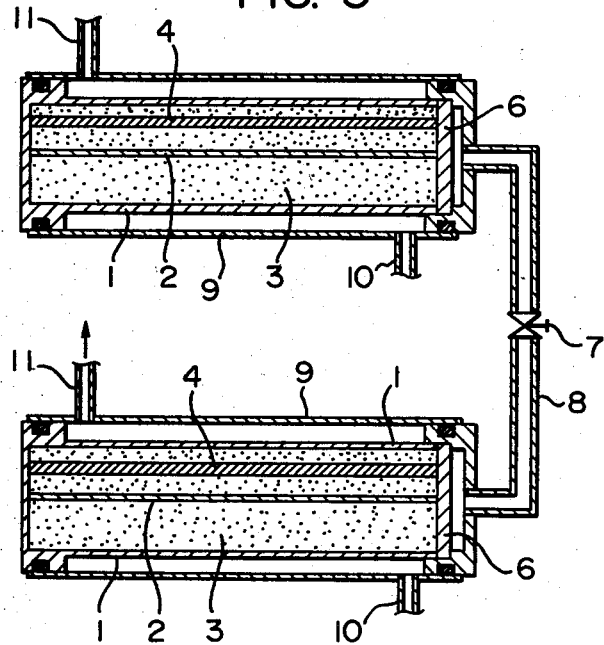
FIG. 5 is a sectional view, taken axially, showing one example of using the reactors shown in FIGS. 1 and 2 as a heat pump.

As FIG. 5 shows, one end of the pressure receptacle is closed, and its other end is opened through a filter 6 which is permeable to hydrogen gas but impermeable to a metal hydride. The heat-conducting fins 2 and the porous members 4 extend axially to the full length of the pressure receptacle 1. The outside surface of the tubular pressure receptacle 1 is surrounded by a heat medium receptacle 9, and a heat medium incoming pipe 10 and a heat medium outgoing pipe 11 are provided in the heat medium receptacle 9.

A metal hydride 3 fills each of the four chambers of the pressure receptacle 1. Since the divided chambers extend axially, the metal hydride can be easily inserted from one end thereof.

The porous member 4 forms a hydrogen gas flow passage leading to the opening of the pressure receptacle 1 through the filter 6. The porous members 4 extend the full length of the pressure receptacle, and can permit uniform diffusion of hydrogen to the metal hydride in the pressure receptacle and thus uniform hydrogen occluding and releasing reactions of the metal hydride.

The metal hydride occludes hydrogen supplied from the porous members 4 and generates heat. The heat is conducted to a heat medium in the heat medium receptacle 9 through the heat-conducting fins 2. Likewise, the metal hydride absorbs heat upon releasing of hydrogen, and the cooling output is transmitted to the heat medium in the receptacle 9 through the heat-conducting fins 2, that is, heat is drawn from receptacle 9 to the metal hydride through fins 2.

FIG. 5 shows an example of a heat pump built by using the above-described metal hydride reactors. A pair of reactors are connected by means of a hydrogen gas flow pipe 8 equipped with a valve 7 through filters 6. Metal hydrides having different equilibrium dissociation pressure characteristics fill the pressure receptacles of the pair of reactors. Such a heat pump is used to take out a cooling output for a cooling heat source or a heating output for a heating heat source.

The metal hydride reactor of the invention shown in FIGS. 6 and 7 includes a tubular porous member 4 extending along the center axis of a pressure receptacle 1 and a plurality of heat-conducting fins 2 extending axially of the tubular pressure receptacle 1 and also in the direction of the center axis from the inner wall of the tubular receptacle 1 to the outside wall of the porous member 4. These heat-conducting fins 2 progressively decrease in thickness as they extend in the direction of the center axis from their outside ends. Thus, a plurality of axially elongated chambers are formed along the pressure receptacle 1, and a metal hydride 3 fills these chambers.

In the metal hydride reactor of this invention shown in FIGS. 8 and 9, four plate-like heat-conducting fins 4 arranged at angular intervals of 90 degrees are connected to a cylindrical member 12 at their inside ends in the direction of the center axis, and a porous member 4 is inserted in the cylindrical member 12. A plurality of cuts 13 are provided in the cylindrical member 12 transversely thereto. These cuts 13 form a hydrogen flow passage between the metal hydride and the porous member 4. The porous member 4 may be pillar-like, but preferably formed in the shape of a tube having an inside diameter of 1 to 10 mm.

FIG. 10 shows an embodiment which is the same as that shown in FIGS. 8 and 9 except that many apertures 13' are provided instead of the cuts 13. FIG. 11 shows an embodiment which is the same as that shown in FIGS. 8 and 9 except that a single slit 13" is provided instead of the cuts 13, and a plurality of cuts 14 are formed on the outside ends of the heat-conducting fins 2. The outside ends of the heat-conducting fins 2 are kept in close contact with the inside surface of the tubular pressure receptacle 1 by such means as a thermal insert method or welding.

Figure 12:
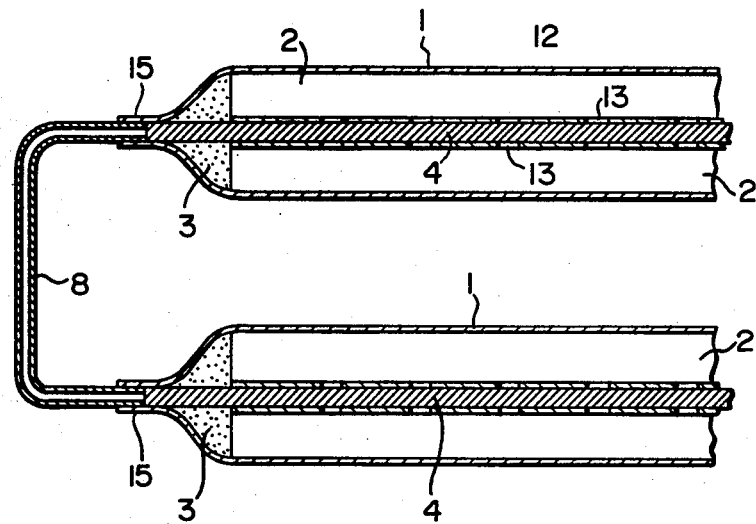
FIG. 12 is a sectional view, taken axially, which shows an example of using the reactors shown in FIGS. 8 and 9 as a heat pump.

In the embodiment shown in FIG. 12, a pair of reactors of the type shown in FIGS. 8 and 9 are combined to build a heat pump which functions in the same way as the heat pump shown in FIG. 5. The open end portion of each pressure receptacle 1 is reduced in diameter by drawing to form an open end 15. A hydrogen flow pipe 8 is provided connecting the two pressure receptacles 1. One end of a porous member 4 extending through each receptacle and one end of the hydrogen flow pipe 8 are fixed at the open end 15. Metal hydrides having different equilibrium dissociation pressure characteristics fill the pair of reactors.

Figure 13:
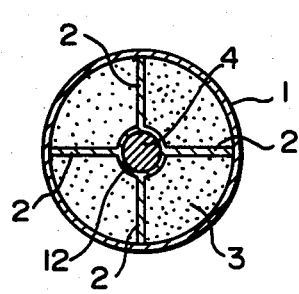
FIG. 13 is a sectional view, taken across the axis of a receptacle, of another embodiment of this invention.
Figure 14:
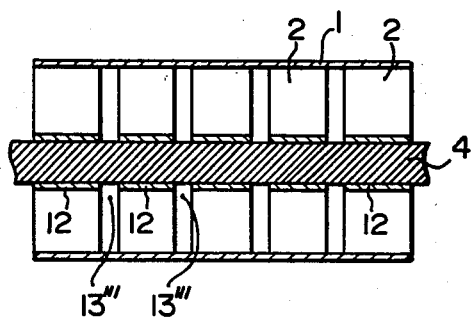
FIG. 14 is a sectional view, taken axially, of the embodiment shown in FIG. 13.

The embodiment shown in FIGS. 13 and 14 is the same as that shown in FIGS. 8 and 9 except that instead of the cuts 13 of the inside cylinder 12 in FIG. 9, a plurality of spaces 13''' are formed by providing heat-conducting fins 2 at 90° angular intervals as a one-piece unit with an inside cylinder 12 and dividing the heat-conducting fins 2 into a plurality of sections in the axial direction of pressure receptacle 1.

Figure 15:
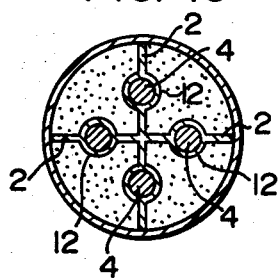
FIG. 15 is a sectional view, taken across the axis of a receptacle, of another embodiment of this invention.
Figure 16:
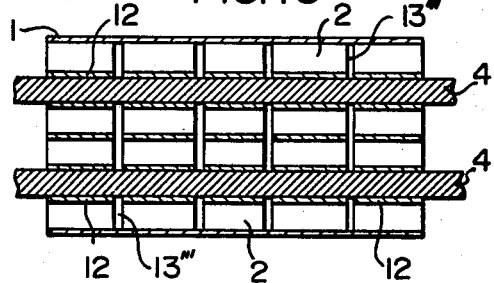
FIG. 16 is a sectional view taken axially of the embodiment shown in FIG. 15.

The embodiment shown in FIGS. 15 and 16 is the same as that shown in FIGS. 13 and 14 except that instead of one inside cylinder along the axis of the receptacle, inside cylinders 4 are provided respectively at the central positions of four heat-conducting fins 2 in the radial direction, and porous members 4 are inserted respectively in these inside cylinders. The porous members 4 are preferably in the form of a tube having an inside diameter of 0.1 to 3 mm and a pore diameter of 1 to 5 microns.

Figure 17:
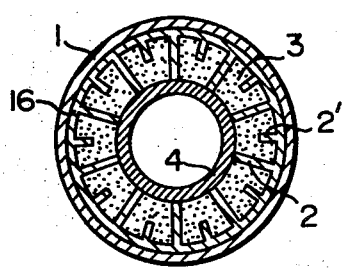
FIG. 17 is a sectional view, taken across the axis of a receptacle, of another embodiment of this invention.
Figure 18B:
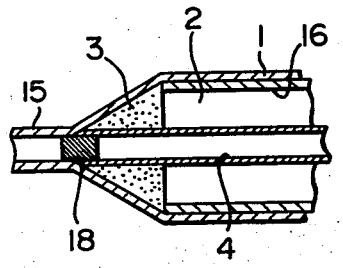
FIG. 18-(a) is a sectional view taken axially of the embodiment shown in FIG. 17.
Figure 18A:
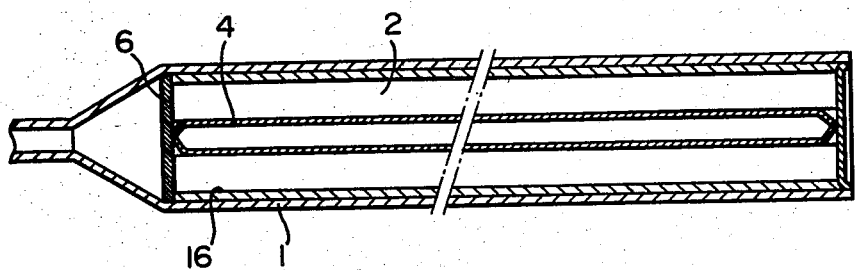

FIGS. 17 and 18 (a) and (b) show other embodiments of the present invention. In these embodiments metallic fin tube 16 is provided in contact with the inner surface of a cylindrical metallic pressure receptacle 1, and a plurality of metallic heat-conducting fins 2 which are diametrically long and a plurality of metallic heat-conducting fins 2' which are diametrically short are alternately provided such that they project inwardly from the metallic fin tube 16 toward the axis of the receptacle 1. A tubular porous member 4 (preferably made of a fluorocarbon resin) is supported approximately at the axis of the receptacle by the inside ends of the plurality of diametrically long heat-conducting fins 2. A metal hydride 3 fills a plurality of spaces defined by the metal fin tube 16, the heat-conducting fins 2 and 2' and the porous member 4. Desirably, the metallic fin tube 16 is in full contact with the pressure receptacle 1 in order to reduce heat resistance. Such a full contact may be obtained, for example, by a method comprising forming the metallic fin tube 16 by extrusion of aluminum and fitting the tubular pressure receptacle 1 over its outside by a drawing technique, a method comprising expanding the metal fin tube by applying pressure to its inside, or a method which comprises bonding the metal fin tube to the pressure receptacle with an adhesive.

The pressure receptacle 1 is open at one end and closed at the other. In the embodiment shown in FIG. 18-(a), a porous filter 6 permeable to hydrogen gas but impermeable to metal hydride which is composed, for example, of a sintered metallic body is provided at the open end portion of the receptacle 1, and the heat-conducting fins 2, the metallic fin tube 16 and the tubular porous member 4 extend from the closed end of the receptacle 1 to the filter 6. The two ends of the tubular porous member 4 are closed, for example, by heat sealing to prevent the metal hydride from coming into the porous member 4.

In the embodiment shown in FIG. 18-(b), one end of the tubular porous member 4 abuts against the narrowed open end portion 15 of the pressure receptacle 1, and between the porous member 4 and the open end portion 15 is disposed a porous cylindrical filter 18 which is permeable to hydrogen gas but impermeable to a metal hydride.

Figure 19:
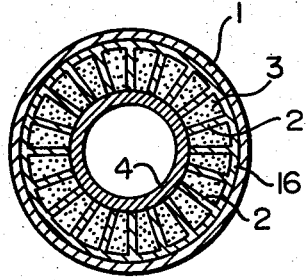
FIG. 19 is a sectional view, taken across the axis of a receptacle, of another embodiment of this invention.
Figure 20:
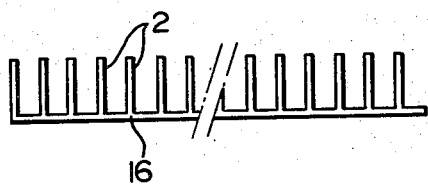
FIG. 20 is a sectional view showing a method of making the heat-conducting fin shown in FIG. 19.

The projecting lengths of the heat-conducting fins 2 from the metallic fin tube 16 may be made equal as shown in FIG. 19. The heat-conducting fins shown in FIGS. 17 and 19 are made, for example, by bending an extrusion-molded article having a comb-like cross section as shown in FIG. 20 into a circular shape and inserting it into the receptacle 1. In FIG. 20, the spacing between adjacent heat-conducting fins 2 is preferably not more than 5 mm.

Figure 21:
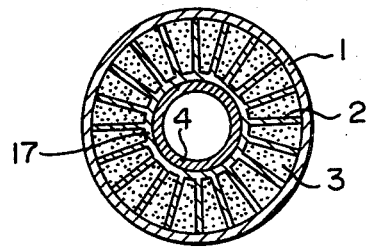
FIG. 21 is a sectional view, taken across the axis of a receptacle, of another embodiment of this invention.

In the embodiment shown in FIG. 21, instead of the metallic fin tube 16 kept in contact with the inside surface of the receptacle 1, there is provided a metallic fin tube 17 in contact with the porous member 4, and a plurality of heat-conducting fins 2 are caused to project radially in the diametrical direction of the receptable 1.

In the embodiment shown in FIG. 21, a plurality of axially spaced cutouts are preferably provided, for example, at the diametrical ends of the heat-conducting fins as means for passing hydrogen between the divided chambers of the pressure receptacle.

Figure 22:
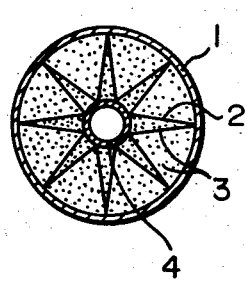
FIG. 22 is a sectional view, taken across the axis of a receptacle, of another embodiment of this invention.
Figure 23:
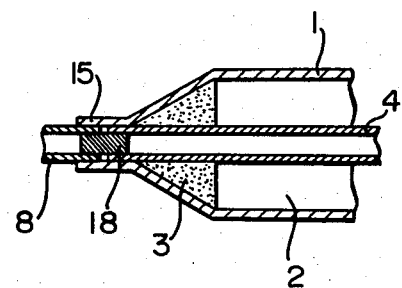
FIG. 23 is a sectional view taken axially of the embodiment shown in FIG. 22.

In the metal hydride reactor shown in FIGS. 22 and 23, the heat-conducting fins 2 consist of a thin metallic sheet having a number of apertures. For example, a continuous metallic sheet having a thickness of about 0.01 to 0.8 mm produced by rolling is bent into a corrugated shape and disposed around the porous member 4 such that the ridges of the corrugated sheet contact the inside surface of the pressure receptacle 1 and the furrows of the corrugated sheet contact the outside surface of the porous member 4. A metal hydride 3 fills an axially long spaced defined by the outside surface of the corrugated heat-conducting fin and the inside surface of the tubular pressure receptacle and an axially long space defined by the inside surface of the corrugated heat-conducting fin and the outside surface of the porous member. The apertures provided in the corrugated heat-conducting fin 2 have a diameter of about 0.1 to about 2 mm and are arranged at a pitch of about 2 to about 20 mm. Suitably, the pressure receptacle 1 has an inside diameter of about 10 to about 50 mm and a length of several hundred millimeters, and in this case, the suitable pitch of the corrugations of the sheet is 2 to 20 mm.

As is seen from FIG. 23, the open end portion of the pressure receptacle 1 is reduced in diameter by drawing, and the narrowed opening 15 holds one end of the tubular porous member 4 and one end of the hydrogen flow pipe 8. A cylindrical filter 18 made of a sintered metallic body permeable to hydrogen but impermeable to a metal hydride is inserted in the inside of the end portion of the tubular porous member 4 at the open end of the receptacle 1.

Figure 24:
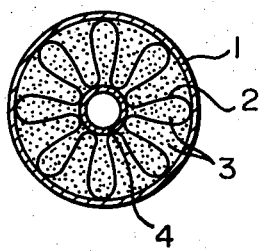
FIG. 24 is a sectional view, taken across the axis of a receptacle, of another embodiment of this invention.

In the metal hydride reactor of the invention shown in FIG. 24, the heat-conducting fin 2 is composed of a sheet of a fibrous material having permeability to hydrogen. A continuous fibrous sheet is bent into a corrugated shape and disposed around the porous member 4 such that its ridges contact the inside surface of the tubular pressure receptacle 1 and its furrows contact the outside surface of the porous member 4. A metal hydride 3 fills both diametrically long spaces defined by the outside surface of the corrugated heat-conducting fin and the inside surface of the tubular pressure receptacle and diametrically long spaces defined by the inside surface of the corrugated heat-conducting fin and the outside of the porous member. Woven or non-woven fabrics of various organic or inorganic fibers may be used as the fibrous sheet. A sheet composed of carbon fibers is especially preferred because of its light weight and high heat conductivity. Pulp or the like may be incorporated into the carbon fibers in order to improve their moldability. Suitably, the pressure reactor 1 has an inside diameter of about 10 to about 50 mm and a length of several hundred millimeters. The porous member 4 is preferably in the form of a tube having an outside diameter of about 2 to about 20 mm. The suitable pitch of the corrugations of the fibrous sheet is 2 to 20 mm.

Figure 25:
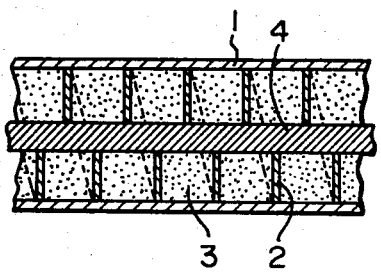
FIG. 25 is a sectional view, taken axially, of another embodiment of this invention.
Figure 26:
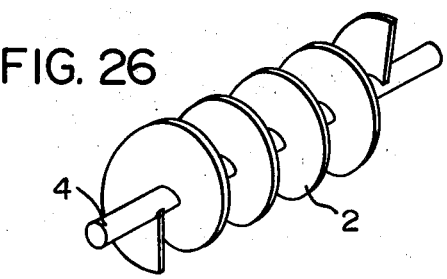
FIG. 26 is a perspective view of the heat-conducting fin in the embodiment shown in FIG. 25.

Still another embodiment of the invention is illustrated in FIGS. 25 and 26. As shown in FIG. 26, the heat-conducting fin 2 is composed of a single spiral plate surrounding a pillar-like or tubular porous member 4. The heat-conducting fin 2 and the porous member 4 of these structures are positioned within a tubular pressure receptacle 1. The outside end of the spiral heat-conducting fin is kept in contact with the inside surface of the tubular pressure receptacle in order to achieve good heat conduction between the heat-conducting fin and the wall surface of the tubular pressure receptacle. The two may be fixed by welding. A metal hydride 3 fills a spiral space formed by the pressure receptacle 1, the porous member 4 and the heat-conducting fin 2. The porous member 4 needs not to be in contact with the heat-conducting fin 2. Conveniently, they are fixed to each other because the metal hydride can be inserted in the aforesaid space while rotating the porous member and the heat-conducting fin together. The spiral heat-conducting fin restricts the transfer of the metal hydride within the receptacle to prevent it from gathering locally in the receptacle, and also improves heat conduction within the receptacle.

Figure 27:
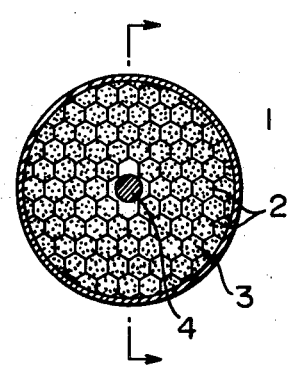
FIG. 27 is a sectional view, taken across the axis of a receptacle, of another embodiment of this invention.
Figure 28:
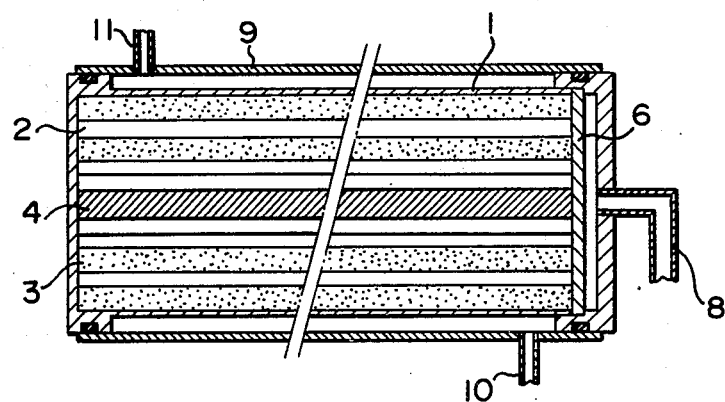
FIG. 28 is a sectional view taken axially of the embodiment shown in FIG. 27.

Another embodiment of the invention is illustrated in FIGS. 27 and 28. As shown in FIG. 27, the heat-conducting fin 2 is in the form of a honeycomb when viewed in section taken across the axis of the receptacle 1, and therefore, a number of spaces are formed which extend axially of the pressure receptacle. Some of the walls of the honeycomb cells at the central portion of the fin 2 are removed, and a porous member 4 is inserted in the resulting space. A metal hydride 3 fills the spaces defined by the other honeycomb cells. A number of apertures or cuts are provided on the honeycomb walls to permit flowing of hydrogen gas. The outermost wall of the honeycomb structure is kept in contact with the inside surface of the tubular pressure receptacle in order to achieve good heat conduction between the honeycomb-like heat-conducting fin and the inside surface of the tubular pressure receptacle. For this purpose, the insertion of the honeycomb-like fin 2 into the pressure receptacle 1 is effected preferably by the thermal inserting method. Alternatively, the inside surface of the tubular pressure receptacle may be welded with the outermost wall of the honeycomb structure. Preferably, the ratio of the metal hydride filled is adjusted to 30 to 50% by volume. As in the embodiment shown in FIG. 5, the open end portion of the pressure receptacle 1 is connected to a hydrogen flow pipe 8 through a filter 6. A heat medium receptacle 9 may be provided externally of the pressure receptacle 1.

Figure 31:
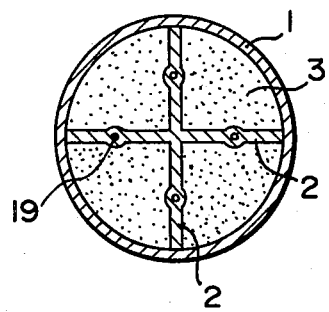
FIG. 31 is a sectional view, taken across the axis of a receptacle, of another embodiment of this invention.
Figure 29:
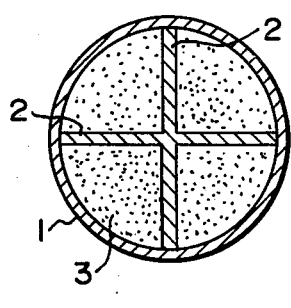
FIG. 29 is a sectional view, taken across the axis of a receptacle, of another embodiment of this invention.
Figure 30:
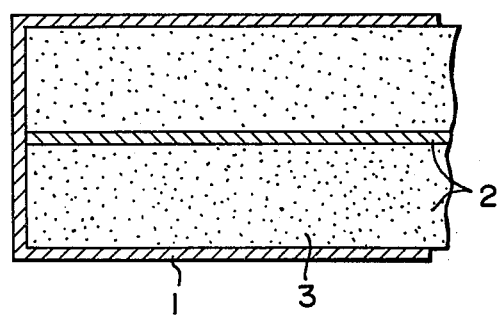
FIG. 30 is a sectional view taken axially of the embodiment shown in FIG. 29.

In the embodiment shown in FIGS. 29 to 31, the heat-conducting fin itself is composed of a porous material which is permeable to hydrogen but impermeable to a metal hydride, so that the heat-conducting fin itself forms a hydrogen flow passage. In FIGS. 29 and 30, two plate-like heat-conducting fins 2 composed of a porous material cross each other perpendicularly at the axis of the receptacle 1 and extend axially of the receptacle. The heat-conducting fins 2 are inserted in the receptacle 1 by, for example, the thermal inserting method, and as a result of the outside ends of the heat-conducting plates contacting the inside wall of the tubular receptacle, good heat conduction is achieved between the two. Alternatively, the two may be welded to each other. The pressure receptacle 1 is divided into four axially long chambers by the heat-conducting fins 2, and a metal hydride 3 fills these chambers. The heat-conducting fins are suitably made of a sintered body of a metal such as aluminum, stainless steel, copper or brass or a heat-resistant durable synthetic resin such as a fluorocarbon resin.

The embodiment shown in FIG. 31 is the same as that shown in FIG. 29 except that some parts of the plate-like heat-conducting fins 2 are increased in thickness, and hydrogen flow holes 19 are provided respectively in these parts. The pressure drop at the time of hydrogen gas flowing is reduced by the provision of the hydrogen flow holes 19, and even when the pressure receptacle 1 is slender, a hydrogen flow passage is surely formed.

The following Examples more specifically illustrate the present invention.

EXAMPLE 1

Heat pump devices were built for use in hydride reactors in Runs (d) to (f) (invention) and (a) to (c) (comparison). These heat pump devices were operated, and their performances were compared.

In Runs (d), (e) and (f), metal hydride reactors of the types shown in FIGS. 3-(b), 21 and 17, respectively, were used. In Runs. (a), (b) and (c), the metal hydride reactors shown in FIGS. 32-(a), (b) and (c), respectively, were used. The reactor shown in FIG. 32-(a) had no heat-conducting fin nor porous member; the reactor shown in FIG. 32-(b) had a tubular porous member 4 but no heat-conducting fin; and the reactor shown in FIG. 32-(c) had a plurality of heat-conducting fins 2 crossing each other at the axis of the pressure receptacle 1 but no porous member.

Two sets of heat pumps A were provided. Each heat pump A was built, as shown in FIG. 33, by combining a plurality of pairs of metal hydride reactors having filled with metal hydrides $M_1H$ and $M_2H$ having different equilibrium dissociation pressure characteristics through a filter 26. One group of reactors in the heat pump A which contained the metal hydride $M_1H$ was inserted into one heat medium receptacle 20, and the other group of reactor containing the metal hydride $M_2H$, was inserted into another heat medium receptacle 21. In the heat medium receptacle 20, a heat medium flowed from an inlet port 22 toward an outlet port 23, and a heat medium in the heat medium receptacle 21 flowed from an inlet port 24 toward an outlet port 25 in concurrent relationship with the heat medium in the receptacle 20.

The heat pumps were operated in these Runs (a) to (f), and their performances were compared. The results are shown in Table 1. The specifications and the operating conditions of these heat pump devices were as follows:

1. Metal hydrides
   Amount filled: 20 kg per a group of reactors
   (40 kg per heat pump A)
   Ratio of filling into the receptacle: 0.5
   Types: $M_1 = LaNi_{4.7}Al_{0.3}$
   $M_2 = LaNi_5$
2. Operating temperature (in the cooling mode)
   Heat source endothermic temperature: 87° C. (input)
   Cooling endothermic temperature: 15° C. (output)
   Atmospheric radiant temperature: 30° C.
3. Materials
   Tubular pressure reactor: copper
   Heat-conducting fins: aluminum
   Porous members: porous Teflon (registered trademark)
   Filters: sintered brass
   Heat medium receptacles: copper
4. Dimension of each tubular pressure receptacle
   Outside diameter: 19.05 mm (¾ inch)
   Wall thickness: 0.8 mm
   Length: 500 mm
5. Dimension of the porous member
   (b), (d): 3 mm in outside diameter and 0.5 mm in thickness
   (e): 8 mm in outside diameter and 1 mm in thickness
   (f): 9 mm in outside diameter and 1 mm in thickness
6. Cycle time of each heat pump device A: 26 minutes
   If two heat pumps A are operated, an output is obtained every 13 minutes alternately from each heat pump A.
7. Detailed structure of the component parts

| Run | Heat-conducting fins number | Heat-conducting fins thickness (mm) | Cross-sectional area of the metal hydride filled part ($mm^2$) | Required total tube length per half of heat pump A (m) | Heat-conducting surface area per half of heat pump A ($mm^2$) | Heat capacity per half of heat pump A (kcal/°C.) |
|---|---|---|---|---|---|---|
| (a) | 0 | — | 239 | 21 | 1.25 | 6.0 |
| (b) | 0 | — | 232 | 21.5 | 1.29 | 6.0 |
| (c) | 10 | 1 | 174 | 29 | 1.72 | 7.1 |
| (d) | 10 | 1 | 167 | 30 | 1.79 | 7.2 |
| (e) | 20 | 0.5 | 142 | 35 | 2.11 | 7.7 |
| (f) | 20 | 0.5 | 125 | 40 | 2.39 | 8.0 |

In the device in Run (d), cuts having a width of 2 mm and a depth of 2 mm were provided on the peripheral part of the fins at a pitch of 25 mm axially of the reactor. In the device of Run (e), the fins were cut axially of the reactor at a pitch of 25 mm to provide spacing having a size of 2 mm. These were for the purpose of facilitating diffusion of hydrogen through the chambers divided by the fins.

The two ends of the porous Teflon tube were heat-sealed as shown in FIG. 18-(a) to prevent entry of a powder of metal hydride therein.

TABLE 1

| Run | Performances of the heat pump devices (two sets of heat pumps A) | | | | | |
| --- | --- | --- | --- | --- | --- | --- |
|  | (a) | (b) | (c) | (d) | (e) | (f) |
| Coefficient of performance | 0.008 | 0.092 | 0.014 | 0.37 | 0.45 | 0.45 |
| Cooling output (kcal/hr) | 17 | 208 | 35 | 1480 | 2310 | 2330 |

Table 1 shows that the performance of the heat pump device is poor when it includes neither a heat-conducting fin nor a porous member as in Run (a); that the performance of the heat pump device is not so much improved when it contains either one of the heat-conducting fin or the porous member as in Runs (b) and (c); and that the performance of the heat pump device is much improved when it contains both the heat-conducting fin and the porous member as in Runs (d), (e) and (f). The better performance of the heat pump devices in Runs (e) and (f) than that of the device in Run (d) is due mainly to the presence of a larger number of heat-conducting fins. The heat pump device in Run (f) is advantageous in regard to construction because it is not necessary to provide cuts in the fins or cut the fins as in Runs (d) and (e).

EXAMPLE 2

In the metal hydride reactor shown in FIGS. 1 and 2, a copper tube having an outside diameter of 19 mm and a length of 50 cm was used as the pressure receptacle 1; aluminum plates were used as the heat-conducting fins; and a tube of sintered stainless steel having an outside diameter of 4 mm, an inside diameter of 2 mm and a pore diameter of 2 microns was used as the porous member 4. 350 grams of LaNi$_5$ as a metal hydride was inserted to fill each of the four divided chambers. Hydrogen gas under 4 kg/cm$^2$ was introduced into the receptacle while cooling the outside surface of the tubular pressure receptacle with water kept at 20° C. to carry out the hydrogen occluding reaction of LaNi$_5$. The reaction ended in about 20 minutes, and heat was obtained in an amount of about 10 kcal.

EXAMPLE 3

In the metal hydride reactor shown in FIGS. 3-(a) and 4, the same pressure receptacle 1 and porous member 4 as in Example 2 were used. Two aluminum plates each having eight square cuts 5, 1 mm×1 mm in size, at each outside end contiguous to the inner surface of the receptacle 1 were provided as heat-conducting fins as shown in FIG. 3-(a).

In the same way as in Example 2, the hydrogen occluding reaction of LaNi$_5$ was carried out in the metal hydride reactor. The reaction ended in about 20 minutes, and heat in an amount of about 10 kcal was obtained.

EXAMPLE 4

The hydrogen occluding reaction of LaNi$_5$ was carried out in the same way as in Example 3 except that a porous polytetrafluoroethylene tube having an outside diameter of 3 mm, an inside diameter of 2 mm and a pore diameter of 1 micron was used instead of the tube of sintered stainless steel. The reaction ended in about 20 minutes, and heat was obtained in an amount of about 10 kcal.

COMPARATIVE EXAMPLE 1

The hydrogen occluding reaction of LaNi$_5$ was carried out in the same way as in Example 2 except that the porous member was not used. A period of about 40 minutes was required until the reaction was over.

EXAMPLE 5

In the metal hydride reactor shown in FIGS. 13 and 14, a copper tube having an outside diameter of 19 mm and a length of 50 cm was used as the pressure receptacle 1, and sixteen heat-conducting fin structures each consisting of an inside cylinder 12 having an inside diameter of 6 mm and four aluminum heat-conducting fins connected to it as a one-piece structure were positioned at equal intervals in the receptacle 1. Each of the heat-conducting fin structures had a length of 3 cm in the axial direction of the receptacle 1. A tube of sintered stainless steel having an outside diameter of 4 mm, an inside diameter of 2 mm and a pore diameter of 2 microns was used as the porous member 4. Was filled with 350 g of LaNi$_5$. Hydrogen gas under 4 kg/cm$^2$ was introduced into the reactor while cooling the outside surface of the copper tube with water kept at 20° C., and the hydrogen occluding reaction of LaNi$_5$ was carried out. The reaction ended in about 20 minutes, and heat was obtained in an amount of about 11 kcal.

COMPARATIVE EXAMPLE 2

The hydrogen occluding reaction of LaNi$_5$ was carried out in the same way as in Example 5 except that the porous member was not used. A period of about 40 minutes was required until the reaction was over.

What we claim is:

1. A metal hydride reactor comprising:
   a tubular pressure receptacle having an opening at one end thereof and containing a metal hydride therein, at least a part of the outer wall surface of said tubular pressure receptacle forming a heat-exchanging surface;
   means, including at least on heat-conducting fin formed of a heat-conducting material within said receptacle, for transmitting heat from the metal hydride in said receptacle through said at least one fin to said heat-exchanging surface, and for limiting the location of the metal hydride in said pressure receptacle; and
   at least one axially elongated elastically deformable, plastic porous member extending axially of said receptacle so as to form within said receptacle a hydrogen gas flow passage leading to said opening of said receptacle, said porous member being permeable to hydrogen gas and impermeable to the metal hydride.

2. The reactor of claim 1, wherein said at least one heat-conducting fin comprises a plurality of heat-conducting plate-like fins extending axially along said tubular pressure receptacle and toward the center axis of said receptacle from the inner surface of said receptacle.

3. The reactor of claim 2, wherein said porous member extends approximately along the axis of said tubular pressure receptacle, and at least one of said plurality of heat-conducting plate like fins extends from the surface of said receptacle in the direction of the center axis to said porous member, whereby the receptacle is divided into a plurality of axially long chambers.

4. The reactor of claim 1, further comprising a tubular fin member contacting the inner surface of said receptacle, said at least one fin comprising a plurality of heat-conducting plate-like fins extending axially along said receptacle and toward said center axis from said tubular fin member.

5. The reactor of claim 4, wherein said porous member extends approximately along the axis of said tubular pressure receptacle, and at least one of said plurality of heat-conducting plate-like fins extends from the surface of said receptacle in the direction of center axis to said porous member, whereby the receptacle is divided into a plurality of axially long chambers.

6. The reactor of claim 1, wherein said porous member is sintered.

7. The reactor of claim 1, wherein said porous member is stretched.

8. The reactor of claim 1, wherein said porous member is a rod.

9. The reactor of claim 1, wherein the porous member is a tube.

10. The reactor of claim 2, further comprising an inner cylinder extending approximately along said center axis, wherein said plurality of heat-conducting plate-like fins are connected to said inner cylinder, and said porous member is received within said inner cylinder.

11. The reactor of claim 10, wherein cuts are formed in said inner cylinder for passing hydrogen gas therethrough.

12. The reactor of claim 10, wherein said inner cylinder is divided into a plurality of sections axially of the receptacle, and these sections are provided axially in spaced-apart relationship with each other.

13. The reactor of claim 2, wherein said plurality of heat-conducting fins are connected to each other approximately at the center axis of said pressure receptacle, whereby said receptacle is divided in a plurality of axially long chambers, and said porous member is received in at least one of said divided chambers.

14. The reactor of claim 2, 3 or 13, wherein a number of openings are provided in said plurality of heat-conducting fins for passing hydrogen gas therethrough.

15. The reactor of claim 1 or claim 2, wherein said at least one heat-conducting fin includes a thin sheet having many apertures, which is bent into a corrugated form.

16. The reactor of claim 1 or claim 2, wherein said at least one heat-conducting fin includes a fibrous sheet having permeability to hydrogen, which is bent into a corrugated form.

17. The reactor of claim 1, wherein the porous member extends approximately along the axis of said pressure receptacle, and said at least one heat-conducting fin is composed of a plate-like member surrounding said porous member in helical shape.

18. The reactor of claim 1, wherein said at least one heat-conducting fin is in the form of a honeycomb having spaces extending axially of said receptacle, and a number of openings are formed on said honeycomb walls for passing hydrogen gas therethrough, and said porous member is received in at least one of said spaces.

19. The reactor of claim 1, wherein said at least one heat-conducting fin is a metallic fin produced by extrusion molding.

20. The reactor of claim 2 wherein said porous member is a stretched porous article composed of a fluorocarbon resin.

21. A heat pump comprising two metal hydride reactors, each reactor including:

a tubular pressure receptacle having an opening at one end thereof and containing a metal hydride therein, at least a part of the outer wall surface of said tubular pressure receptacle forming a heat-exchanging surface;

means, including at least one heat-conducting fin formed of a heat-conducting material within said receptacle, for transmitting heat from the metal hydride in said receptacle through said at least one fin to said heat-exchanging surface, and for limiting the location of the metal hydride in said pressure receptacle; and at least one axially elongated elastically deformable, plastic porous member extending axially of said receptacle so as to form within said receptacle a hydrogen gas flow passage leading to said opening of said receptacle, said porous member being permeable to hydrogen gas and impermeable to the metal hydride;

the hydride in said two reactors having different equilibrium dissociation pressure characteristics, and two reactors being connected through openings in the pressure receptacles of each such that hydrogen gas is exchangable between said two reactors.

22. The heat pump of claim 21, wherein each set of reactors consists of a plurality of unit reactors connected to each other.

* * * * *